Sept. 22, 1925.

J. YOUNG ET AL 1,554,940

FISHHOOK

Filed May 26, 1925

INVENTORS
John Young and
Charles C. Ehler
by Wilkinson & Giusta
ATTORNEYS.

Patented Sept. 22, 1925.

1,554,940

UNITED STATES PATENT OFFICE.

JOHN YOUNG AND CHARLES C. EHLER, OF HUNTINGTON, INDIANA.

FISHHOOK.

Application filed May 26, 1925. Serial No. 32,968.

*To all whom it may concern:*

Be it known that we, JOHN YOUNG and CHARLES C. EHLER, citizens of the United States, residing at Huntington, in the county of Huntington and State of Indiana, have invented certain new and useful Improvements in Fishhooks; and we do hereby declare the following to be a full, clear, and exact description of the invention, such as will enable others skilled in the art to which it appertains to make and use the same.

The present invention relates to improvements in fish hooks and has for an object to provide a weedless attachment for the hooks wherein is obviated the frequent misses in connection with the use of weedless bait.

With the use of present forms of so called "weedless bait;" when the fish strikes, the weedless arrangement permits it to slip off.

It is a further object of the invention therefore to provide a weedless arrangement which will not permit the fish to slip off the bait when the strike is made from either the top, bottom or side of the hook.

A further object of the invention is to avoid the device becoming disengaged from the same when striking hard surfaces, such as lily pads or the like.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
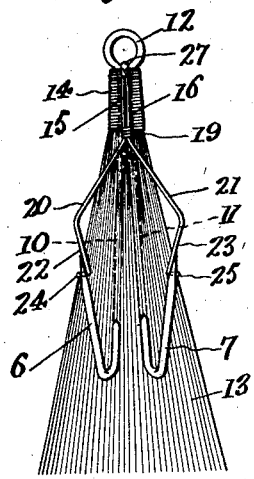
Figure 1 is a front view of a double fishing hook constructed according to the present invention with the weedless attachment engaged with the hooks.

Referring more particularly to the drawings 6 and 7 designate fish hooks mounted in double or duplex arrangement and diverging outwardly from one another. The hooks may be of the ordinary form having the barbs 8 and the points 9. The hooks are carried upon the shanks 10 and 11 which converge upwardly and are provided with the eye 12 to which the fishing line is attached. 13 represents the squirrel tail attachment bound just beneath the eye 12 by the binding strands 14.

Figure 3:
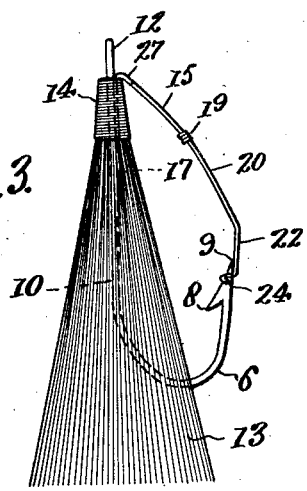
Figure 3 is a side view of the device in the engaged position.
Figure 4:
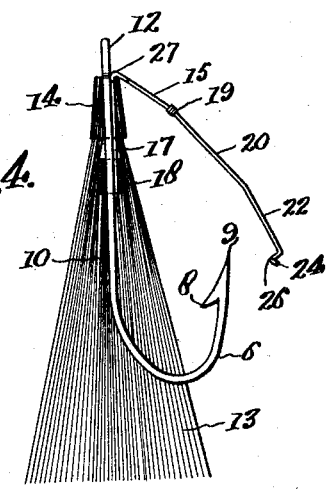
Figure 4 is a vertical section showing the device in the disengaged position.
Figure 5:
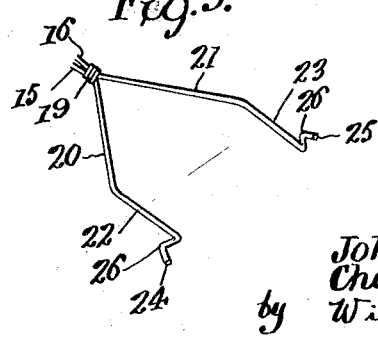
Figure 5 is a perspective view of the attachment.

The weedless attachment consists of the two resilient wires 15 and 16 having their end portions indicated at 17 in Figure 4 disposed between the binding strands 14 of the squirrel tail and also between further binding strands 18 beneath the squirrel tail and surrounding the shanks of the hooks. The portions 15 and 16 of the weedless wires extend in substantial parallelism just in front of the binding strands 14, and they may be secured together by the collar or looped wire 19. The wires 15 and 16 are slightly separated and they project diagonally from the binding strands. Outwardly of the loop 19 the wires diverge into the spread arms 20 and 21 which arms are bent slightly downward from the loop 19 as indicated in Figures 3 and 4. The arms 20 and 21 carry the convergent fingers 22 and 23 having the half loops or open hooks 24 and 25 bent outwardly from the lower ends thereof. These hooks 24 and 25 are bent rearwardly or toward the squirrel tail and thence outwardly in a substantially rounded sweep with a V-notch 26 shown in Figure 5. The fingers 22 and 23 are further bent slightly inward from the plane of the arms 20 and 21. The two wires 15 and 16 at their upper ends adjacent the eye 12 are soldered or otherwise secured together as indicated at 27. This forms a pointed anchorage from which the spring effect of the arms takes place.

Figure 2:
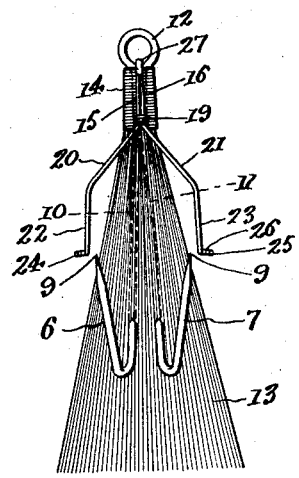
Figure 2 is a similar view with the attachment disengaged.

The arms, as shown in Figures 2 and 3, are given a bent or resilient tendency to spring apart from, and beyond the two hooks 6 and 7 in a lateral direction (see Figure 2); while also these arms are biased to a position extending beyond the front portions of the hooks, as shown in Figure 4, where the weedless wires are disengaged from the hooks.

When the wires are attached to the hooks 6 and 7, however, as shown in Figures 1 and 2 the fingers 22 and 23 will be put under resilient tension which will tend to hold the weedless devices more firmly on the hooks. The weedless attachment will also be put under tension at right angles to the spring tension of the fingers 22 and 23 and when disengaged the weedless wires will spring outwardly in front of the hooks so as not to interfere with the strike. The spring tendency of the fingers 22 and 23 is in a direction laterally outward, while the fingers themselves extend inwardly of the fish hooks, and thus reinforce the terminal looped ends of the wires, and prevent the attachment from becoming easily disengaged.

Of course, while the device is shown in connection with a two hook combination, it might be used on a single hook or on a three hook combination. The device will effectually act as a weedless attachment for hooks, while at the same time it will not prevent the strike from any direction. This weedless attachment for hooks is to be used on any and all forms of artificial bait.

It is obvious that various changes and modifications may be made in the details of construction and design of the above specifically described embodiment of this invention without departing from the spirit thereof, such changes and modifications being restricted only by the scope of the following claims.

What is claimed is:—

1. A weedless attachment for fish hooks comprising a spring guard wire having a half loop at its end adapted to engage with a fish hook, said half loop extending in a plane substantially at right angles to the wire which carries it, said wire adapted to occupy a position at one side of said fish hook when the half loop is engaged with the fish hooks, said wire being biased to a position beyond the opposite side of said fish hook when the half loop is released therefrom.

2. In combination with a two point fish hook, of a weedless attachment comprising a pair of wires having outwardly turned half loops extending in planes substantially at right angles to the length of the wires, said half loops adapted to engage the fish hooks, said wires extending on the insides of said double fish hooks when the half loops are engaged and adapted to spring outwardly to the outer sides of the fish hooks when disengaged and also adapted to spring outwardly in front of the fish hooks when disengaged.

3. In combination with a double fish hook having shanks, a squirrel tail secured to the shanks of the hooks, and binding strands about the squirrel tail and shanks, a pair wires having their ends secured by said binding strands and extending diagonally outward from said shanks with their upper portions secured together, means below for loosely holding said secured portions against lateral spreading, arms formed from said wires below said last named means, said arms diverging downwardly and having downwardly convergent fingers with half loops extending outwardly therefrom for engaging with the fish hooks, said arms being bent slightly toward the shanks from a point approximately where said means engage said wires, and said fingers also being bent toward the shanks with respect to said arms, said arms and fingers being biased resiliently to a laterally spread and forward position with respect to the fish hooks and being placed under resilient tension when the half hoops are engaged with the fish hooks.

JOHN YOUNG.
CHARLES C. EHLER.